US006842287B2

(12) United States Patent
Munks et al.

(10) Patent No.: US 6,842,287 B2
(45) Date of Patent: Jan. 11, 2005

(54) INTERFERENCE FILTER FOR OPTICAL TELECOMMUNICATION

(75) Inventors: Timothy C. Munks, North Granby, CT (US); Andrew Finch, Avon, CT (US); Scott Merritt, McLean, VA (US)

(73) Assignee: JDS Uniphase Corporation, San Jose, CA (US)

( * ) Notice: Subject to any disclaimer, the term of this patent is extended or adjusted under 35 U.S.C. 154(b) by 188 days.

(21) Appl. No.: 10/320,972

(22) Filed: Dec. 17, 2002

(65) Prior Publication Data

US 2003/0152319 A1 Aug. 14, 2003

Related U.S. Application Data (60) Provisional application No. 60/341,454, filed on Dec. 17, 2001.

(51) Int. Cl.[7] .............................................. G02B 27/00
(52) U.S. Cl. ......................... 359/579; 359/577; 385/27
(58) Field of Search ....................... 385/27, 123, 147; 359/577–579, 583, 589, 590; 398/85

(56) References Cited

U.S. PATENT DOCUMENTS

| | | | | |
|---|---|---|---|---|
| 5,274,385 A | * | 12/1993 | Riza ........................... 342/375 |
| 5,430,454 A | * | 7/1995 | Refregier et al. ........... 342/375 |
| 5,543,952 A | | 8/1996 | Yonenaga et al. .......... 359/181 |
| 5,917,638 A | | 6/1999 | Franck et al. ............... 359/181 |
| 6,469,817 B1 | * | 10/2002 | Heflinger ..................... 398/202 |
| 6,473,214 B1 | | 10/2002 | Roberts et al. ............. 359/181 |

FOREIGN PATENT DOCUMENTS

WO WO 98/44635 10/1998 ............ H03M/5/16

OTHER PUBLICATIONS

Yonenaga et al., Aug. 1997, Journal of Lightwave Technology, vol. 15, No. 8, pp 1530–1537.*
Wedding et al., Oct. 1994, Journal of Lightwave Technology, vol. 10, No. 12, pp 1720–1727.*
Yonenaga et al., "Dispersion–Tolerant Optical Transmission System Using Duobinary Transmitter and Binary Receiver", Journal of Lightwave Technology, vol. 15, No. 8, Aug. 1997, pp. 1530–1537.
B. Wedding et al., "10–Gb/s optical transmission up to 253 km Via Standard Single–Mode Fiber Using the Method of Dispersion–Supported Transmission", Journal of Lightwave Technology, vol. 12, No. 10, Oct. 1994, pp. 1720–1727.

* cited by examiner

*Primary Examiner*—Frank G. Font
*Assistant Examiner*—Christopher M. Kalivoda
(74) *Attorney, Agent, or Firm*—Allen, Dyer, Doppelt, Milbrath & Gilchrist, P.A.

(57) ABSTRACT

A micro-optic Mach-Zehnder interferometer with a differential delay of n bit periods, where n is an integer number, and thermal bias control is useful as a spectral filter in front of a differential detection system to accomplish a balanced receiver. The interferometer may also be arranged as a Michelson interferometer or a dual-plate interferometer.

17 Claims, 7 Drawing Sheets

INTERFERENCE FILTER FOR OPTICAL TELECOMMUNICATION

RELATED APPLICATIONS

This application claims priority from U.S. Provisional application No. 60/341,454 filed Dec. 17, 2001, the disclosure of which is incorporated herein by reference.

BACKGROUND OF THE INVENTION

Mach-Zehnder and Michelson interferometers are commonly known in optical telecommunication. The first Mach-Zehnder interferometers (MZI) built for balanced receiver applications utilized glass ion exchange waveguides with a 3 dB coupler. These devices were found to have too much polarization dependence. This made biasing the interferometer difficult because the polarization state at the receiver was random and varied with time. This meant that the desired bias point of the interferometer needed to vary with the same dynamics as the input polarization state which is unknown.

It is known, for example from Yonenaga et al., "Dispersion-Tolerant Optical Transmission System Using Duobinary Transmitter and Binary Receiver", Journal of Lightwave Technology, Vol. 15, No. 8, Aug. 1997, pages 1530–1537, and from Yonenaga et al. U.S. Pat. No. 5,543,952 issued Aug. 6, 1996 and entitled "Optical Transmission System", to use duobinary code for a modulating signal supplied in push-pull manner to a dual-drive Mach-Zehnder (MZ) type optical intensity modulator in an optical communications system. The use of duobinary code in this manner reduces the signal bandwidth required for a given signal transmission rate, and permits direct detection to recover the original binary signal at an optical receiver. Such an arrangement again requires an external modulator and involves the costs and risks associated therewith especially in an array transmission system. For example, cross-talk of high voltage, high frequency signals among closely spaced electrical circuits presents a significant problem, and modulation using duobinary encoded signals as disclosed by Yonenaga et al. doubles the voltage swings of signals supplied to the modulators, thereby exacerbating this problem.

An alternative duobinary encoding technique is described in International patent application PCT/CA98/00275 by Northern Telecom Limited, published Oct. 8, 1998 under No. WO 98/44635 and entitled "Duobinary Coding And Modulation Technique For Optical Communication Systems".

The article by Yonenaga et al. referred to above also refers to a dispersion-supported transmission (DST) technique, as disclosed by B. Wedding et al., "10-Gb/s optical transmission up to 253 km Via Standard Single-Mode Fiber Using the Method of Dispersion-Supported Transmission", Journal of Lightwave Technology, Vol. 12, No. 10, October 1994, pages 1720–1727. The DST technique uses direct modulation of a laser diode with a NRZ binary signal to produce an FSK optical signal, and FM-AM conversion in the dispersive optical fiber with direct detection of the AM component at an optical receiver. Consequently, the DST technique requires the frequency deviation of the FSK optical signal to be adjusted, depending upon the chromatic dispersion of the fiber, to match the group delay between the FSK components to the bit duration. In addition, recovery of the NRZ binary signal from the detected AM component of the converted optical signal requires additional processing, for example by an integrator and a decision circuit.

U.S. Pat. No. 6,473,214 issued Oct. 29, 2002 to Nortel Networks Ltd. (Roberts et al.), describes a method and apparatus for optical signal transmission. The specification of the patent is incorporated by reference therewith. According to the patent, a binary signal is encoded to produce a three-level encoded signal having reduced bandwidth. As shown in FIG. 5 of the Nortel patent, an interference filter is provided preferably in the form of a Mach-Zehnder interferometer having an optical splitter and an optical combiner. These define two optical paths. A relative or differential optical signal delay between these two optical paths causes in turn a constructive interference between the two optical paths.

U.S. Pat. No. 5,917,638 to Lucent describes a Mach-Zehnder modulator with a 1-bit delay for the purpose of encoding information in a light beam, applicable to a signal transmitter.

It is an object of the invention to provide a passive interferometric filter for decoding incoming data for a signal receiver.

It is another object of the invention to provide such filter with a relatively high signal-to-noise ratio (SNR) to enable relatively low level signals at the receiver, and with a relatively low polarization loss (PDL).

In the balanced receiver application, it is desirable to have one arm's optical path length to be different from the other arm by n bit lengths. Said another way, it is desirable to delay one path by an integral number of bits. This allows a pair of (not necessarily adjacent) bits to be compared (combined) and allows for common mode noise reduction.

It is also possible to transmit information in a modified duo-binary form so that there is more information content for a given transmission bandwidth. This allows more spectral efficiency or more information to be packed in a DWDM channel at a given transmission rate.

SUMMARY OF THE INVENTION

The invention provides an interferometric filter, or interferometer, to have the two arm's optical path length to be different by m bit periods, where m is an integer. The interferometer has two photodetectors which allows various photodetector output processing combinations.

In accordance with one aspect of the invention, there is provided an optical receiver for binary optical signals comprising an optical input port, an optical power splitter, an optical combiner, an optical path connecting an output of the optical splitter to an input of the optical combiner, a second optical path connecting a second output of the optical splitter to a second input of the optical combiner, a photodiode receiving light from a first output port of the optical combiner, a second photodetector receiving light from a second output port of the optical combiner characterized in that the optical propagation delay for light travelling from the first output port of the optical splitter to the first input port of the optical combiner differs from the optical propagation delay for light travelling from the second output port of the optical splitter to the second input port of the optical combiner by an integral number of bit periods of an optical signal entering the receiver, and the response of the first photodiode receiving light from a first output port of the optical combiner, is combined with the response of the second photodetector receiving light from a second output port of the optical combiner in a negative linear combination.

At least one of the optical paths is unguided.

In one embodiment, the interferometric filter comprises heat control means to control relative delay in two optical paths of the interferometric filter. The heat control means may be a heater, a cooler, a differential heater or equivalent means.

The conversion from optical path length to time is: $t=nl/c$ where:

n is the refractive index of the material l is the physical length of the material, and c is the speed of light.

In an embodiment of the invention, the interference filter is part of a balanced receiver because of the provision of a dual photodetector (photodiode) in association with the interferometric filter which is biased to a desired point on it's transfer function.

BRIEF DESCRIPTION OF THE DRAWINGS

The invention will now be described in more detail in conjunction with the drawings in which.

DETAILED DESCRIPTION OF EMBODIMENTS OF THE INVENTION

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
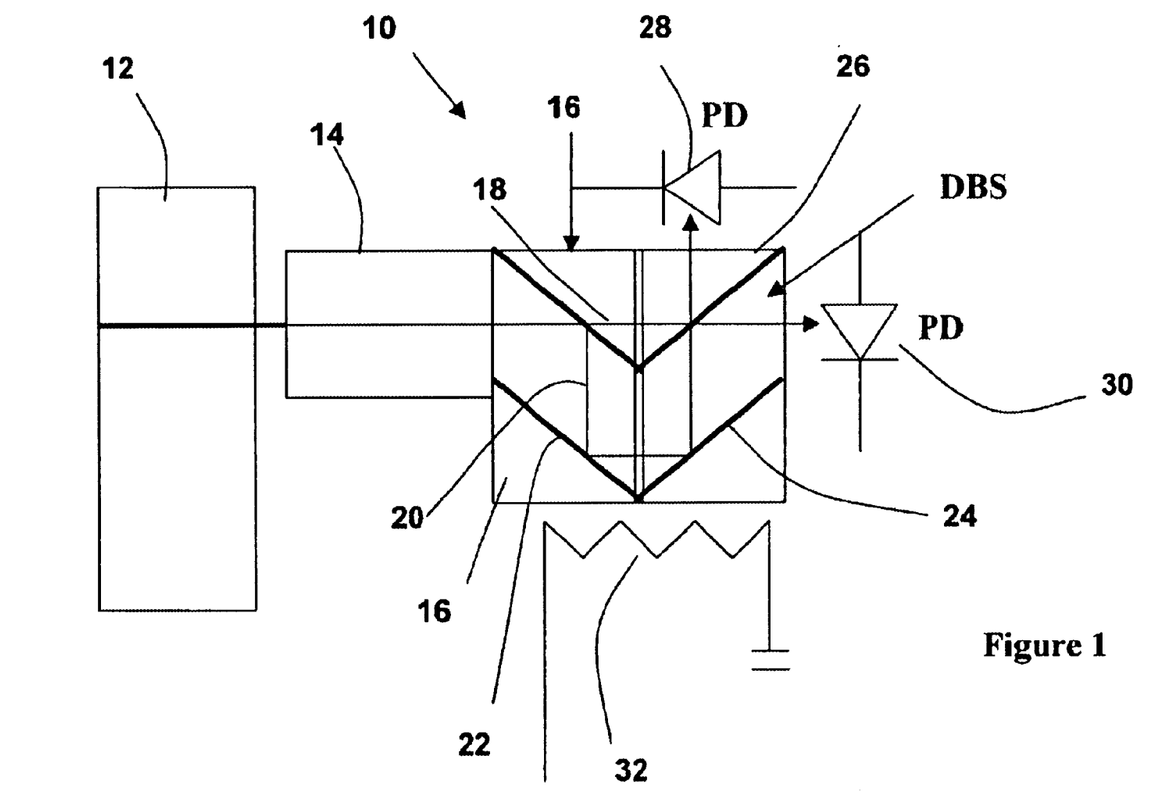
FIG. 1 is a schematic representation of an embodiment of the interference filter of the invention in a Mach-Zehnder (MZ) configuration.

As shown in FIG. 1, light is coupled into the interferometer 10 from a single mode optical fiber 12. This light is either collimated in a collimator 14 or passed through a suitable lens, not shown. The light is then passed to a beamsplitter 16 which splits the light into two component beams in a wavelength independent and polarization independent manner. One component beam 18 is transmitted while the other 20 is reflected. The reflected beam 20 then encounters two mirrors 22, 24, which direct the reflected light beam 20 in a path displaced from the transmitted path 18. The reflected beam and the transmitted beam are then combined at a second beamsplitter 26. A portion of the combined beam is directed up and the other portion is directed to the right. Both portions are incident on a respective photodetector, a photodiode 28, 30.

In order to obtain a high contrast ratio, it is preferred that the transmitted and reflected beams be equal in intensity at the second beamsplitter 26; and preferably should also have a high degree of spatial overlap as well as very little wavefront distortion.

The optical path difference (OPD) of the two legs needs to be controlled to a small fraction <5% of the wavelength of the light. If the wavelength is 1500 nm the OPD must be less than 75 nm. In most glasses, there are two dominant effects which influence the optical path length. They are the change in length of the glass with temperature (CTE) and the change in the refractive index of the glass with temperature (dn/dT).

A heater 32 is installed closer to one of the optical paths than to the other path to adjust and control the OPD of the MZI over variable ambient temperatures. Alternatively, a cooler or a differential heater can be provided to the same effect, i.e. to achieve a suitable temperature difference between the two branches (legs) of the interferometer. It is also used to relax the fabrication tolerances.

The material of the interferometric filter (legs) should be one of low birefringence e.g. glass, to avoid undesirable polarization dependent loss (PDL) phenomena. The CTE (coefficient of thermal expansion) of the two legs should be well matched so that when the device is integrated, using e.g. epoxy, the bond line is not excessively stressed by compression, torsion, tension etc. forces.

Since there is very little polarization dependence in the material, it is possible to have a stable bias point with a variable input polarization state.

It will be clear to those versed in the art that the intent of the MZI is to act as an optical filter in front of a pair of photodiodes. Utilizing summing and differential techniques, noise floors at the receiver can be reduced.

With additional spectral shaping and transmitted signal design, this balanced receiver constitutes a matched optical filter.

Figure 2:
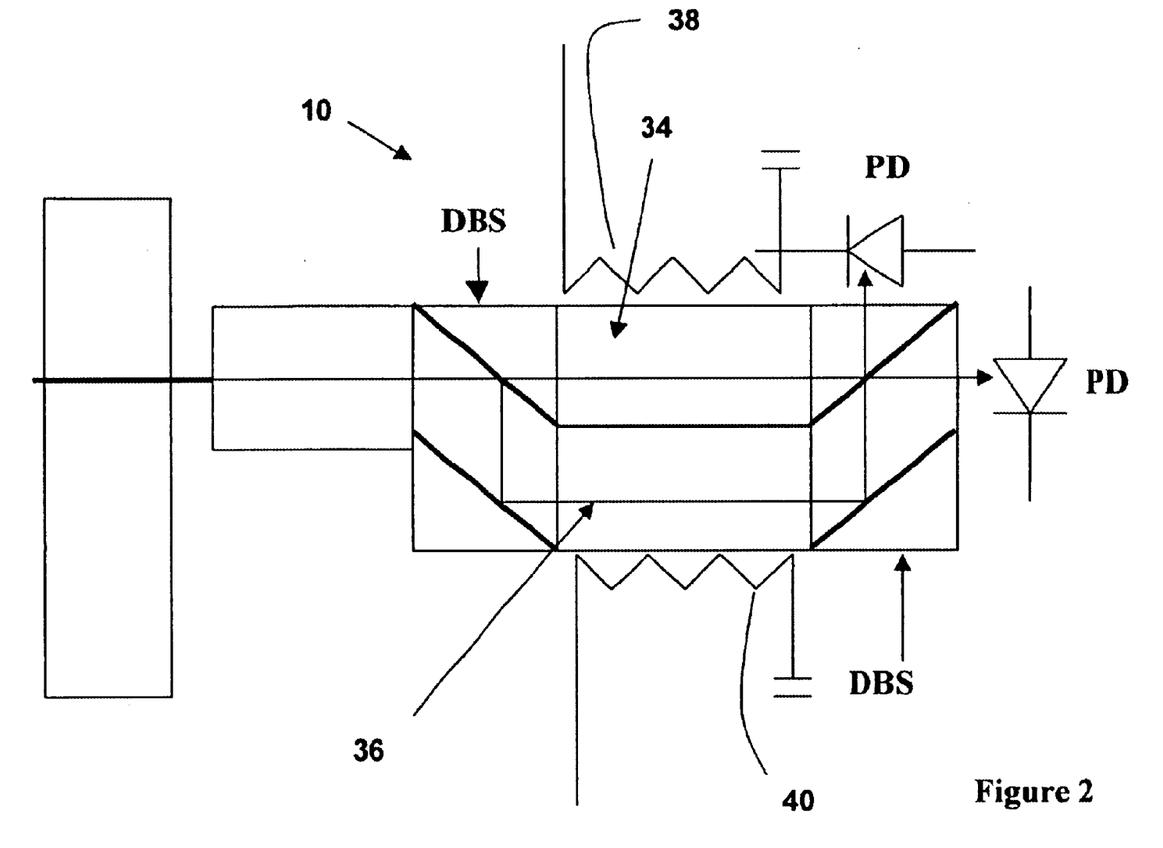
FIG. 2 is a schematic representation of another embodiment of the interference filter in MZ configuration.

Turning now to FIG. 2, the interference filter arrangement differs from that of FIG. 1 by the provision of two glass spacers, a low refractive-index spacer 34 and a high-refractive index spacer 36. The purpose of the spacers is to introduce an optical path difference between the legs of the interferometer 10 so as to optimize the thermal bias control effected by differential heater means 38, 40. More specifically, the use of differential materials of the spacers may serve to achieve a nearly passively temperature compensated design.

It is recommended to design the interferometer so that the optical path difference (OPD) is equal to 1 bit period to within +/−7.5% of a bit period. For instance, at 10 Gb/s the bit period is 100 ps so the inter-arm path delay difference must be between 92.5 and 107.5 ps.

In one embodiment of the invention, the thermal control of the interferometer is designed such that the differential path length is controlled to a fraction of a wavelength (lambda/20=80 nm).

In an embodiment of the invention, differential thermal control is used to improve the sensitivity of the thermal control loop which increases the loop gain. It is preferable to use materials with appropriate thermal characteristics such that the thermal control loop can compensate for environmentally induced bias-point changes at the receiver.

It is recommended to use non-polarization sensitive beam-splitters (with low PDL coatings) such that the extinction ratio (ER) at the photodiodes does not change with input polarization state.

Figure 3:
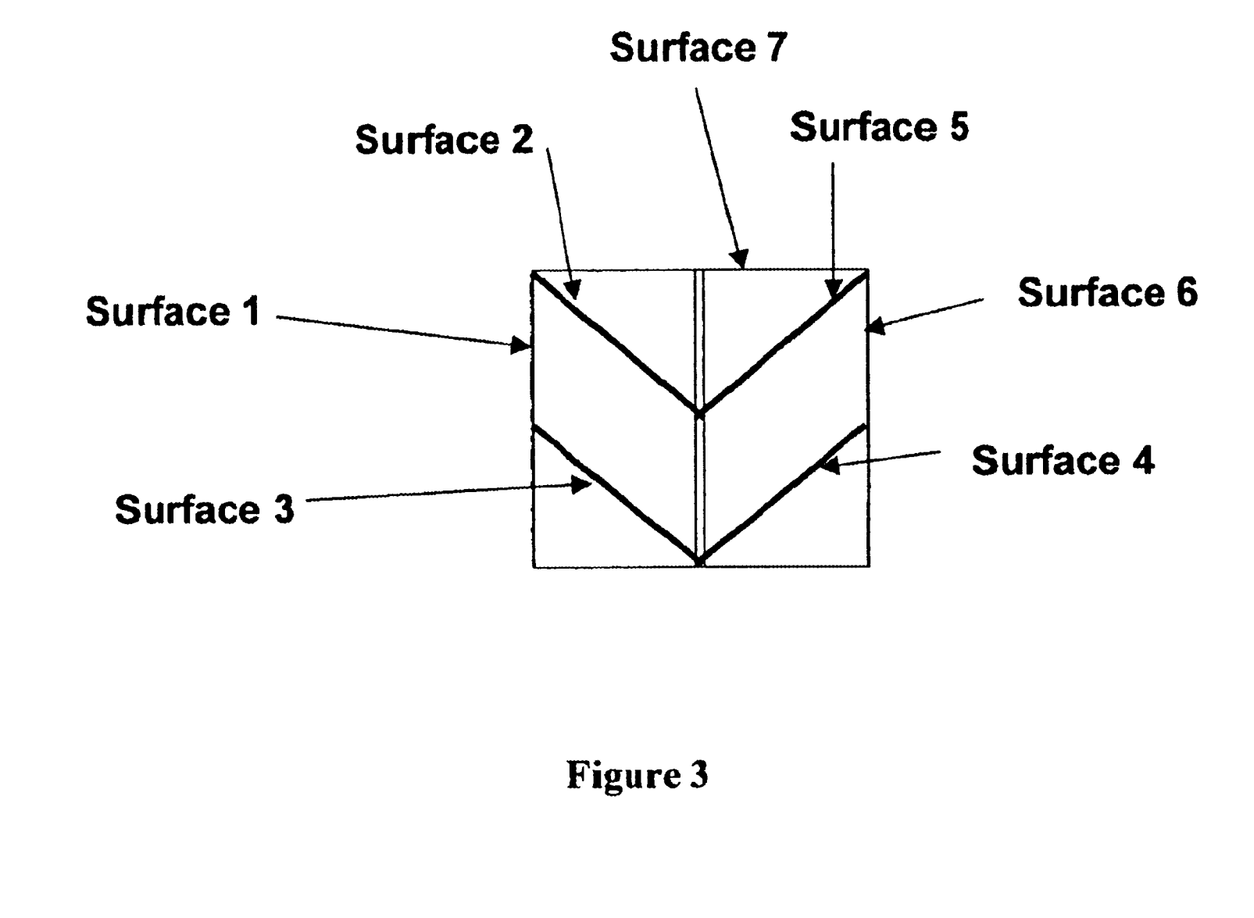
FIG. 3 illustrates the functional surfaces of the embodiment of FIG. 1.

The functional surfaces of the arrangement of FIG. 1 are shown in more detail in FIG. 3. It will be noted that ER (extinction ratio) can be optimized for example by designing the reflectivity of surfaces 3 and 4 to compensate for variation of the transmit to reflect (T:R) split ratio of surfaces 2 and 5. It is also recommended to align and bond the two DBS subassemblies 16, 26 (FIG. 1) so that the through path from surface 1 to surface 6 is straight.

In an embodiment of the invention, the surfaces have the following features:

Surface 1—An AR coating to impedance match Epoxy 353ND, R<0.25%

Surfaces 6 and 7—AR coating for air, R<0.25%

Surfaces 2 and 5—polarization insensitive beamsplitters, $R_s \approx R_p \approx T_s \approx T_p \approx 50\%$ (R—reflectance, T-transmittance)

Surface 3 and 4—HR coatings R>95%

The reflectivity of surfaces 3 and 4 may be used to compensate for the beamsplitter R:T such that tye contrast of the fringes is maximized.

Figure 4:
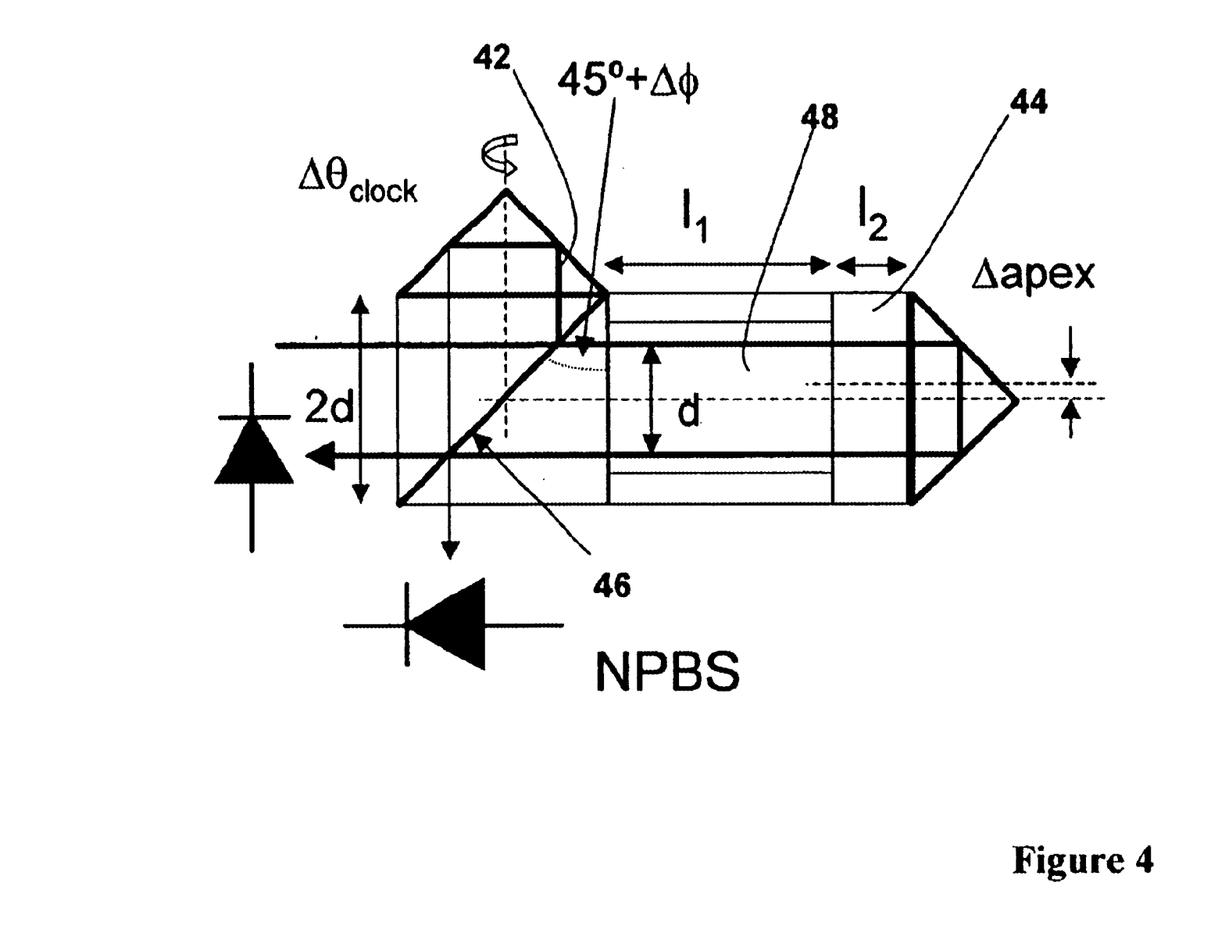
FIG. 4 shows a Michelson configuration of the interference filter of the invention.
Figure 5A:
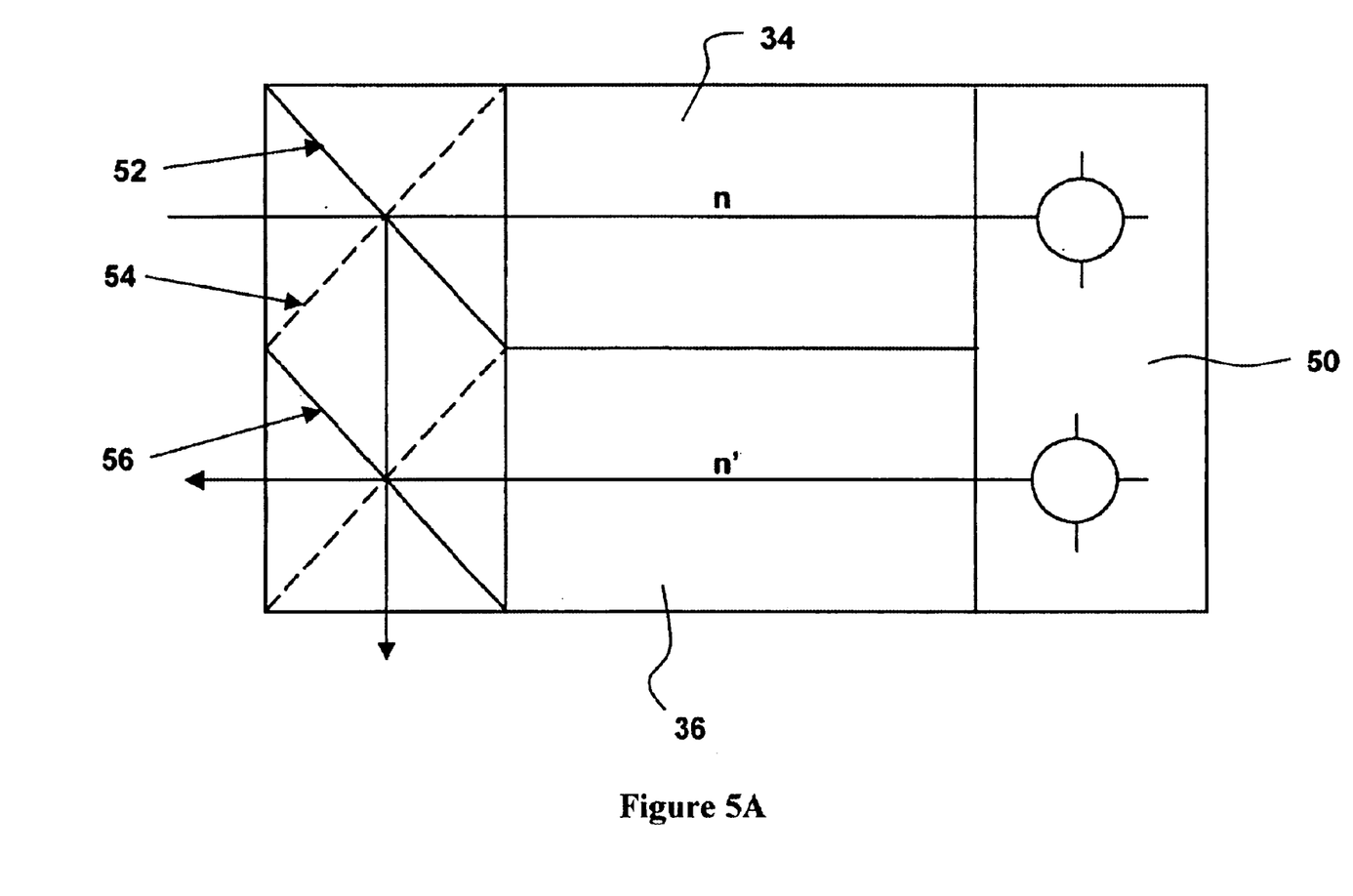
FIGS. 5a and 5b are top view and isometric view, respectively, of a folded embodiment of a MZ configuration of the filter.
Figure 5B:
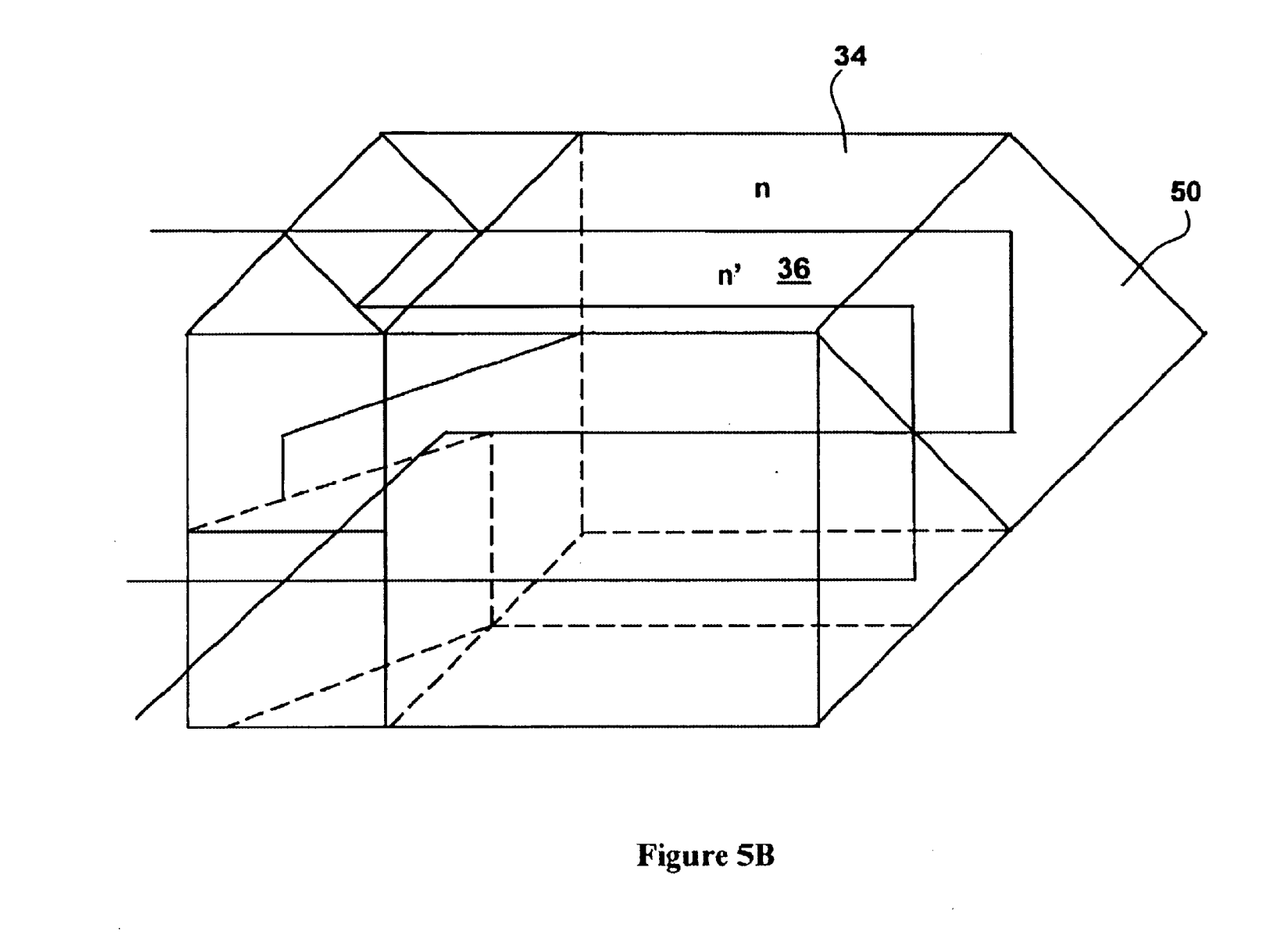
Figure 6:
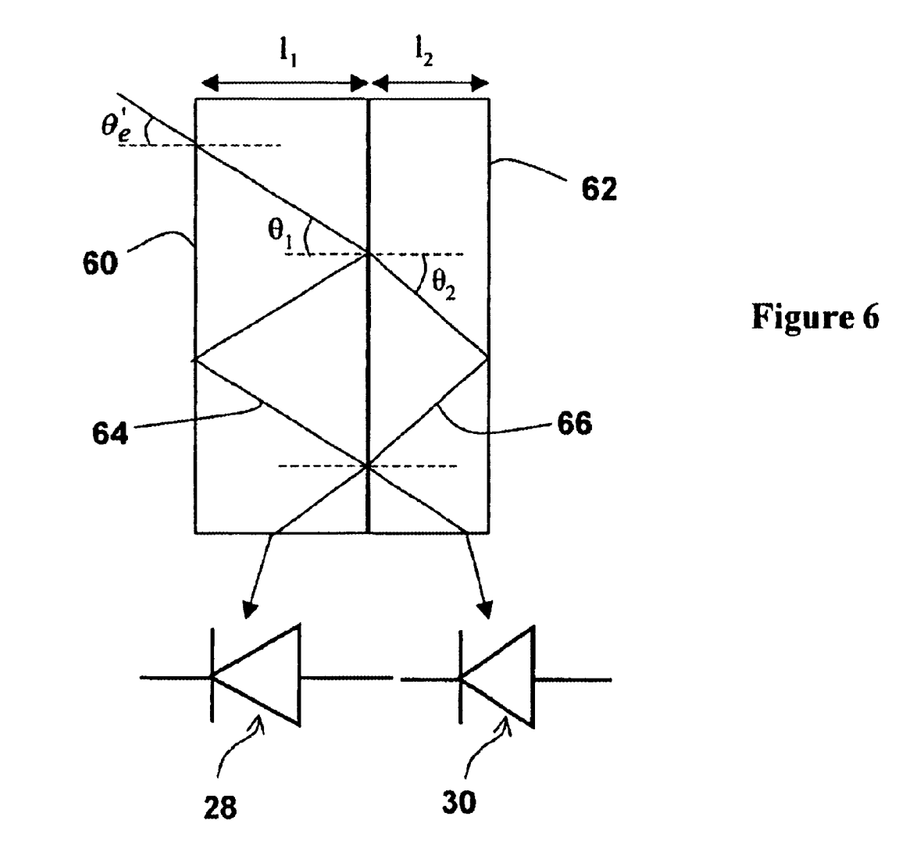
FIG. 6 is a schematic simplified view of a dual plate embodiment of the interference filter of the invention.

In one embodiment of the invention, the input fiber collimator 14 and the photodiodes 28, 30 may be aligned to simultaneously maximize the signal level and ER. It is also advisable for the purposes of the invention to use materials, such as silicon, that have very low birefringence so the ER is not affected by the input polarization state. FIGS. 4–6 illustrate alternative arrangements of the interferometric filter. FIG. 4 shows the filter in a Michelson-type arrangement with air gap. The two paths, split at a non-polarizing beam splitter 46 are indicated as 42 and 44. The material of the filter is fused silica. The air gap 48 serves to reduce the size of the interferometer because of a higher Δn.

FIGS. 5a and 5b represent, in a top view and an isometric view respectively, a folded embodiment of the Mach-Zehnder interferometric filter of the invention. The heat control means are omitted for clarity. It will be seen that the filter of FIGS. 5a and 5b has a so-called roof prism, or corner mirror 50 for reversing the direction of both optical paths of the interferometer. The other elements, like top NPBS 52, bottom high-reflectivity (HR) mirror 54 and top HR mirror 56 are standard components, well known in the art. The filter has two spacers, low RI spacer 34 and high RI spacer 36 analogous to those of FIG. 2.

FIG. 6 shows another embodiment of the interferometric filter of the invention, where the interfering optical paths are guided in two adjoining glass plates 60, 62 of a thickness $l_1$, and $l_{21}$ respectively. The interfering beams 64, 66 are split at the interface of the plates 60, 62 and their portions are directed at two photodiodes 28, 30. The angles of incidence and internal reflection of the beams are indicated as θ', $θ_1$ and $θ_2$, respectively.

In the foregoing specification, the invention has been described with reference to specific embodiments thereof It will, however, be evident that various modifications and changes can be made thereto without departing from the broader spirit and scope of the invention. The specification and drawings are, accordingly, to be regarded in an illustrative rather than a restrictive sense.

What is claimed is:

1. An interference filter for introducing a relative delay between components of an input optical signal, the filter comprising:

an input port for launching the input signal,
   an optical splitter,
   an optical combiner,
   a first optical path connecting an output of the optical splitter to an input of the optical combiner, a second optical path connecting a second output of the optical splitter to a second input of the optical combiner,
   a first photodetector for receiving light from a first output port of the optical combiner, a second photodetector for receiving light from a second output port of the optical combiner, wherein a) the optical propagation delay for light travelling from the first output port of the optical splitter to the first input port of the optical combiner differs from the optical propagation delay for light travelling from the second output port of the optical splitter to the second input port of the optical combiner by an integral number of bit periods of the input optical signal,
   b) the response of the first photodetector is combined with the response of the second photodetector in a negative linear combination, and
   c) at least one of the optical paths is unguided.

2. An interference filter as in claim 1 in which both light paths are unguided.

3. An interference filter as in claim 1 in which the photodetectors are connected in series between a negatively biased power supply and a positively biased power supply.

4. An interference filter as in claim 1 further comprising a thermal control means to control the relative delay in the two optical paths.

5. An interference filter according to claim 4 wherein the thermal control means is a heater disposed to control the relative delay in the two optical paths.

6. The filter according to claim 4 wherein the thermal control means is a cooler disposed to control the relative delay in the two optical paths.

7. An interference filter according to claim 1 comprising
   a non-polarizing beam splitter coupled with the input port for dividing the input signal into first and second sub-beams and for directing the first sub-beam along a first path and the second sub-beam along a second path;
   a non-polarizing beam combiner coupled with the beam splitter for recombining the first and second sub-beam,
   first reflecting means in the first path for redirecting the first sub-beam towards the beam combiner,
   thermal control means in at least one of the paths for controlling relative delay between the first and second sub-beams.

8. The filter of claim 7 wherein the beam splitter and the beam combiner are in direct side-by-side contact.

9. The filter of claim 7 wherein the beam splitter and the beam combiner are spaced and separated by a spacer means.

10. The filter of claim 9 wherein the spacer means comprises a first light-transmissive spacer for transmitting the first sub-beam and a second light transmissive spacer for transmitting the second sub-beam, the first and second spacer having different optical delay characteristics.

11. The filter of claim 7 wherein the reflecting means is a flat mirror.

12. The filter of claim 7 wherein the reflecting means is a 90° corner mirror.

13. The filter of claim 9 wherein the spacer means is air.

14. The filter of claim 7 wherein the reflecting means is a means for redirecting one of the sub-beams by 180° towards the beam combining means.

15. The filter of claim 14 wherein the beam splitting means and the beam combining means are the same element.

16. The filter of claim 7 comprising two directly adjacent plates of a light transmissive material, the plates defining an interface therebetween, the interface disposed to split the input signal into the first and second sub-beam and to combine the first and second sub-beam.

17. The filter of claim 16 further comprising a first and second photodetector, wherein the plates are arranged to direct a portion of the combined first and second sub-beam to the first photodetector and another portion of the combined sub-beams to the second photodetector.

* * * * *

UNITED STATES PATENT AND TRADEMARK OFFICE
CERTIFICATE OF CORRECTION

PATENT NO. : 6,842,287 B2
DATED : January 11, 2005
INVENTOR(S) : Munks et al.

It is certified that error appears in the above-identified patent and that said Letters Patent is hereby corrected as shown below:

Column 5,
Line 40, "$I_{21}$" should read -- $I_2$ --.

Signed and Sealed this

Eighteenth Day of October, 2005

JON W. DUDAS
*Director of the United States Patent and Trademark Office*